Oct. 22, 1929.  E. BACKHAUS  1,733,044
TRANSMISSION
Filed Feb. 6, 1928  4 Sheets-Sheet 1

ERNEST BACKHAUS
INVENTOR

BY Victor J. Evans
ATTORNEY

WITNESS:

Oct. 22, 1929.  E. BACKHAUS  1,733,044
TRANSMISSION
Filed Feb. 6, 1928  4 Sheets-Sheet 2
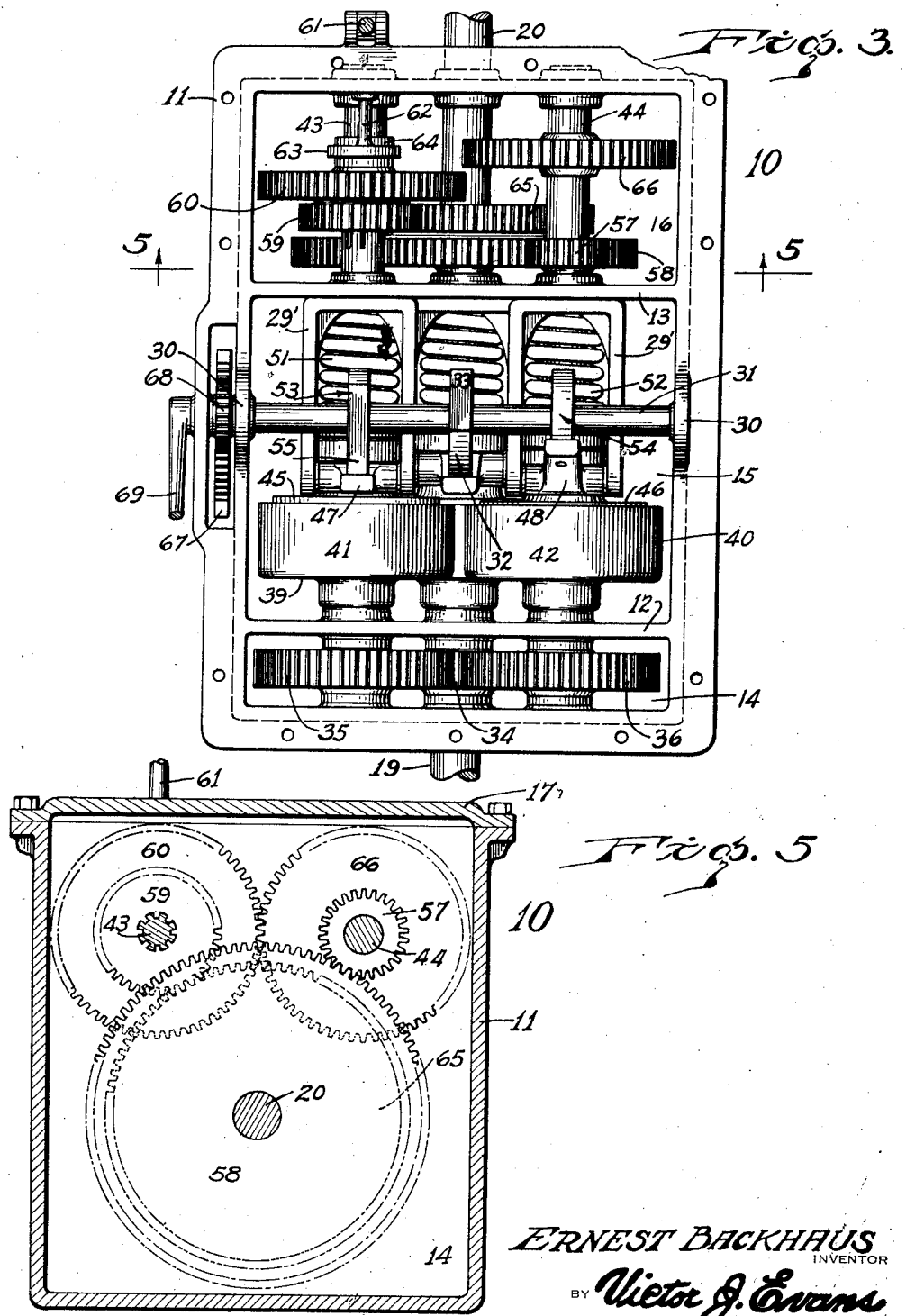
ERNEST BACKHAUS
INVENTOR
BY Victor J. Evans
ATTORNEY

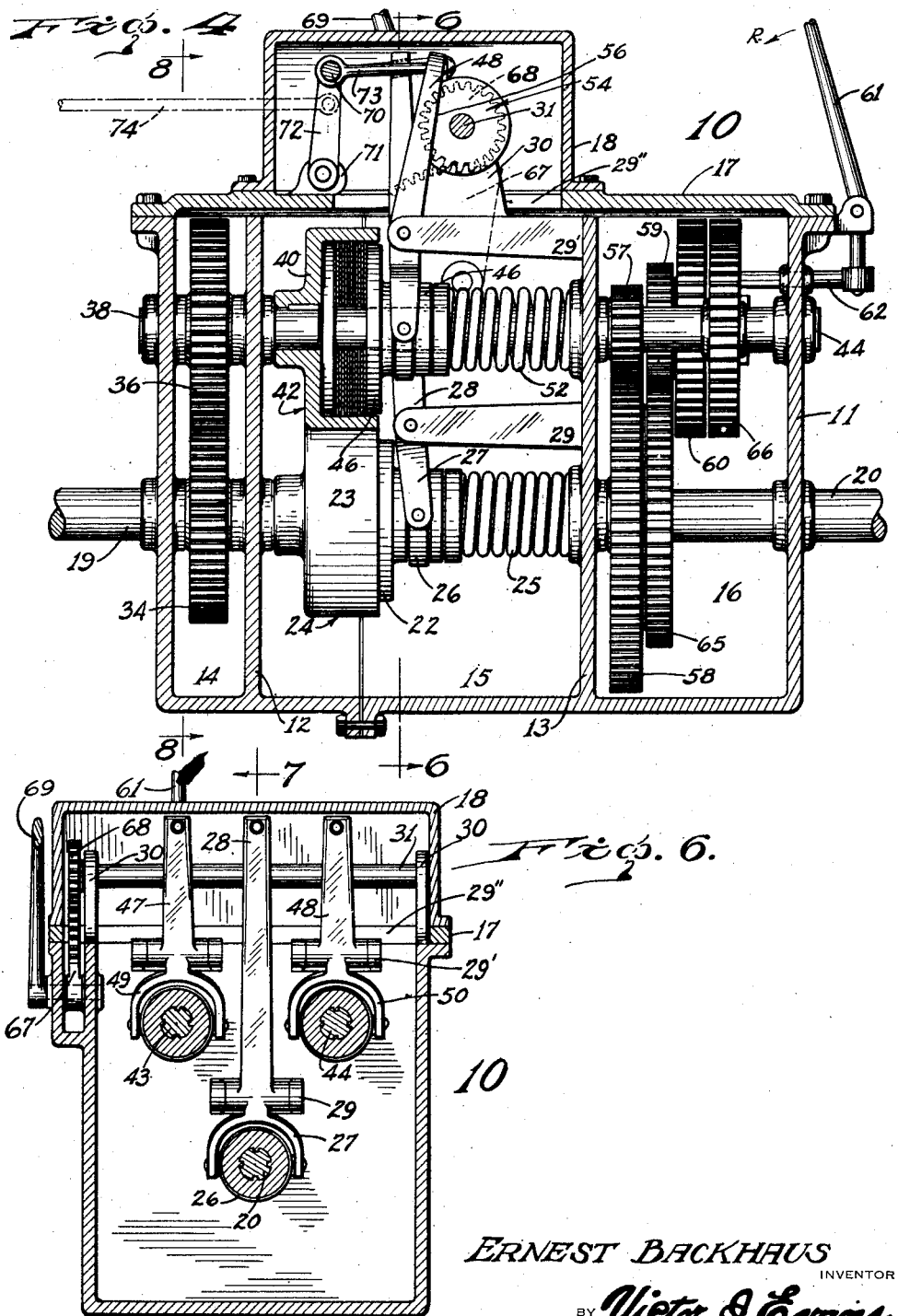

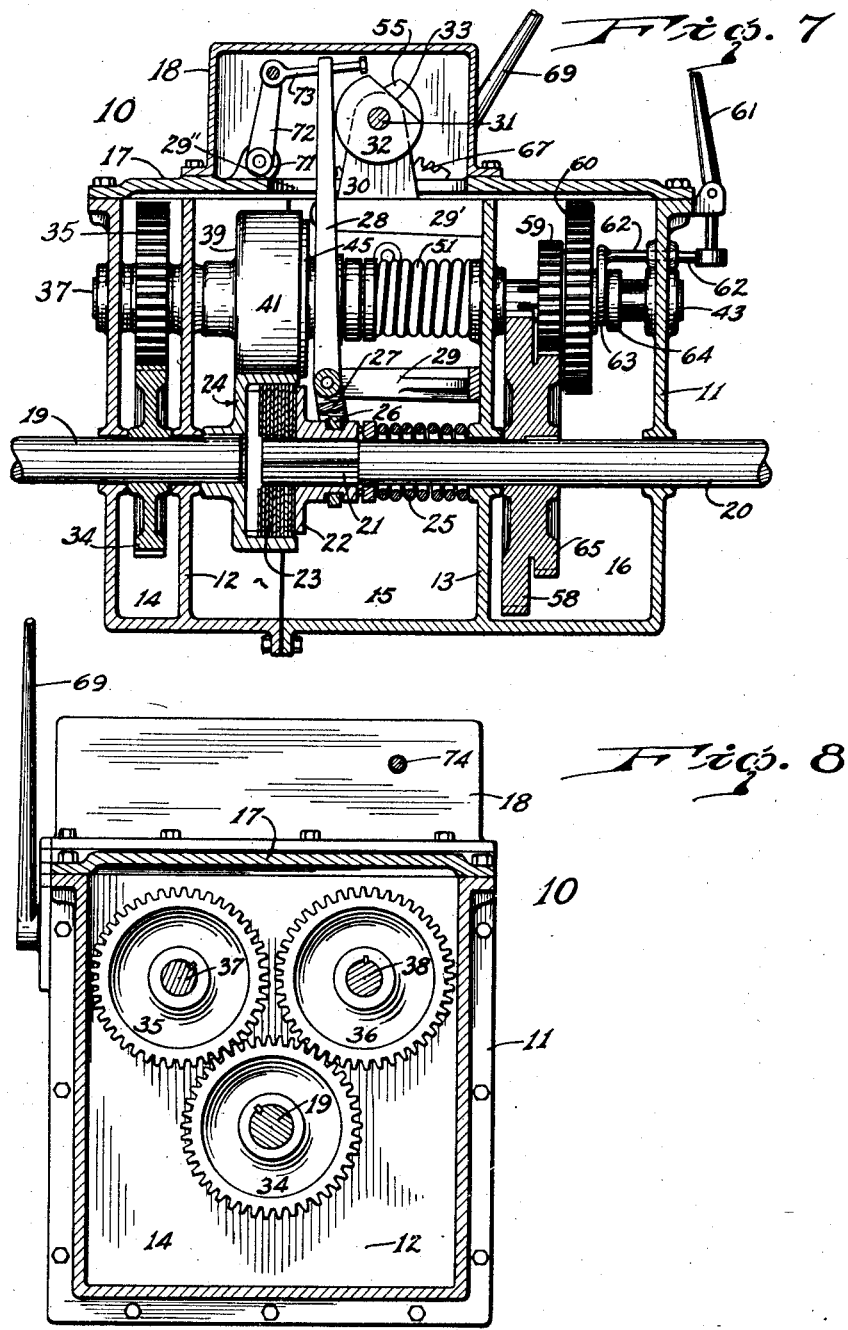

Patented Oct. 22, 1929

1,733,044

UNITED STATES PATENT OFFICE

ERNEST BACKHAUS, OF NEW YORK, N. Y.

TRANSMISSION

Application filed February 6, 1928. Serial No. 252,250.

This invention relates to improvements in transmissions and particularly to variable speed transmissions for motor driven vehicles.

The primary object of the invention resides in a variable speed transmission wherein the shifting of the gears is made possible by the successive actuation of a single lever thus dispensing with the common practice of actuating a clutch pedal to disengage the clutch elements when shifting from one gear ratio to another.

Another object of the invention is to provide a variable speed transmission wherein the usual three forward speeds may be embodied by the shifting of a control lever successively in one direction, thus avoiding any accidental stripping of the gears by moving the lever to a wrong position such as in the present gear shift lever which is movable over an H-shaped course.

Another object is the provision of a variable speed transmission embodying three forward speeds and reverse speed, the reverse action of the driven shaft being obtained by placing the forward speed control lever into second or intermediate gear and moving an auxiliary lever to a reverse speed position.

A further object is to provide a speed transmission which is noiseless in operation, in that there is no clashing of gears during the shifting from one speed to another.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a similar view with the cover plate removed.

Figure 4 is an enlarged vertical longitudinal sectional view.

Figure 5 is a vertical transverse sectional view on the line 5—5 of Figure 3.

Figure 6 is a vertical transverse sectional view on the line 6—6 of Figure 4.

Figure 7 is a vertical longitudinal sectional view on the line 7—7 of Figure 6.

Figure 8 is a vertical transverse sectional view on the line 8—8 of Figure 4.

Figure 1:
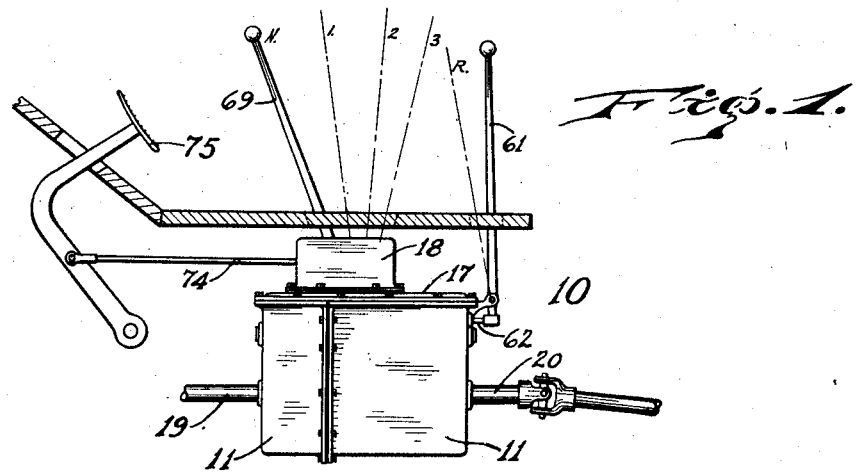
Figure 1 is a side elevational view of my improved transmission.

Referring to the drawing by reference characters, the numeral 10 designates my improved variable speed transmission in its entirety, which includes a housing or casing 11 divided transversely by spaced partitions 12 and 13 into a plurality of separate compartments 14, 15 and 16. A removable cover plate 17 closes the open top of the housing while a removable auxiliary housing 18 is mounted upon the top of the cover plate. Extending through one end wall of the housing 11 is a power or drive shaft 19 which projects into the compartment 15 and has its bearings in the partition 12 and the adjacent end wall of the housing. A driven shaft 20 extends through the opposite end wall of the housing 11 in axial alignment with the drive shaft 19 and also extends into the compartment 15 and has its bearing in the partition 13 and the adjacent end wall of the housing. The inner end of the driven shaft 20 is square in cross section as at 21 for slidably supporting the movable clutch element 22 of a friction clutch 23. The adjacent end of the shaft 19 has a stationary clutch element 24 keyed thereon and which co-acts with the sliding clutch element to impart a direct drive from the drive shaft to the driven shaft. An expansion spring 25 encircles the shaft 20 and is interposed between the partition 13 and the slidable clutch element for normally tending to cause the engagement of the same with the stationary clutch element 24 on the shaft 19.

For the purpose of operatively controlling the actuations of the clutch 23, I provide a collar 26 on the sliding clutch element 22 to which the forked ends of a yoke 27 is pivotally connected. The yoke 27 is formed on the lower end of an actuating lever 28 pivoted in a bracket 29 mounted upon the partition 13. The top end of the lever 28 extends through an opening 29" in the cover plate 17 and into the auxiliary housing 18.

Journalled in bearings 30 rising from the housing 11 is a transversely disposed cam shaft 31 on which a cam disk 32 is fixedly mounted in alignment with the free end of the lever 28. The cam disk has a flat face 33 provided on the periphery thereof and when moved to a position to allow the lever to lie flat thereagainst the spring 25 will cause the co-acting engagement of the clutch elements. When the cam is moved so that any portion of the periphery engages the lever other than the flat face, the lever will of course hold the movable clutch element in a disengaged position against the tension of the spring 25.

Having described the means by which a direct drive may be had from the drive shaft to the driven shaft, which I shall term "high or third speed", I shall now proceed to explain the means by which a "low or first speed" and "intermediate or second speed" may be selectively obtained.

Figure 2:
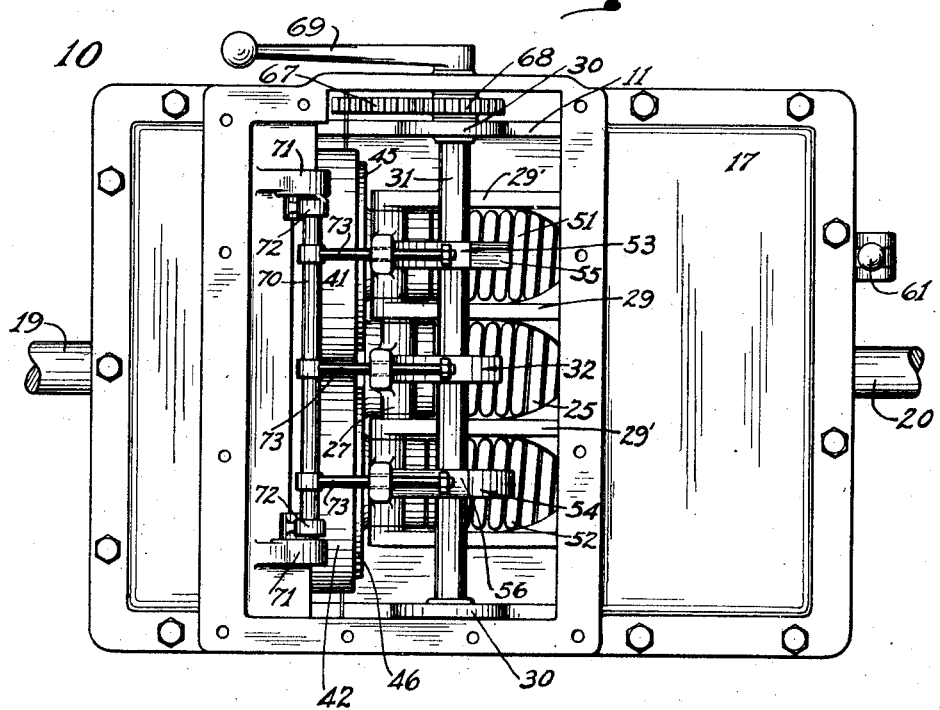
Figure 2 is a top plan view of the same with the upper housing removed.

Fixed to the drive shaft 19 and disposed within the compartment 14 is a main driving gear 34 which has constant meshing engagement with gears 35 and 36 respectively mounted on parallel stub shafts 37 and 38 which have their bearings in one end wall of the housing 11 and partition 12. The stub shafts are arranged above the plane of the shaft 19 and are respectively disposed on opposite sides of the vertical plane of the axis of said shaft. The stub shafts terminate on a plane in alignment with the inner end of the shaft 19 and respectively support the stationary clutch elements 39 and 40 of friction clutches 41 and 42. Journalled in the partition 13 and the adjacent end wall of the casing in axial alignment with the stub shafts 37 and 38 are counter-shafts 43 and 44 respectively, which terminate in close proximity to the stub shafts and slidably support the movable clutch elements 45 and 46 of the friction clutches 41 and 42 respectively. Actuating levers 47 and 48 have their yoked ends 49 and 50 respectively, pivoted to the sliding clutch elements 45 and 46 in a manner similar to the lever 28 and are similarly pivoted in brackets 29'. Expansion springs 51 and 52 encircle the counter-shafts 43 and 44 to normally tend to cause the co-acting engagement of the respective clutch elements. Like the lever 28, the free ends of the levers 47 and 48 extend into the housing 18 and are engageable by cam disks 53 and 54 mounted on the cam shaft 31 and having flat faces 55 and 56 respectively. The flat faces of the cams 32, 53 and 54 are so arranged that only one flat face is engaging its respective lever at a time, and whereupon the cam shaft may be moved to a neutral position wherein none of the flat faces are in engaging positions, at which time all of the clutches are disengaged, such as shown in Figure 2 of the drawings.

Low or first speed is derived through the engagement of the clutch 42 by providing a small pinion gear 57 on the counter-shaft 44 which has constant meshing engagement with a relatively large gear 58 fixed to the driven shaft 20 and disposed within the compartment 16. It will be seen that the ratio between the gears 57 and 58 will impart a slow rotation to the driven shaft compared to the speed of rotation of the drive shaft 19.

For obtaining second or intermediate speed by the engagement of the friction clutch 41, I provide a gear 59 splined to the counter-shaft 43 for sliding movement with a larger reverse gear 60. The gears 59 and 60 are integral and are movable by the actuation of a reverse control lever 61 pivoted on the housing 11. An actuating arm 62 is slidably mounted in the adjacent wall of the housing 11 and has one end pivotally connected to the lever 61 and its other end provided with a yoke 63 for engagement with a collar 64 on the gear 60. When the reverse control lever 61 is pulled back to the position shown in full lines, the gear 59 is in engagement with the gear 65 which is integral with the gear 58 on the shaft 20, but which is smaller than the gear 58. The ratio between the gears 59 and 65 being less than the ratio between the gears 57 and 58, the transmission of speed between the shafts 19 and 20 will be greater.

Also mounted on the counter-shaft 44 is a reverse idler gear 66 with which the gear 60 engages when the lever 61 is pushed to its forward position. To impart a reverse turning movement to the driven shaft, the gears 60 and 66 are brought into mesh and the clutch 41 engaged. Power is then taken from the counter-shaft 43 to the counter-shaft 44 and thence from the shaft 44 to the driven shaft 20 through the meshing gears 57 and 58.

For the purpose of selectively and successively operating the clutches 42, 41 and 23 in the order named, I provide a gear segment 67 pivoted in the housing and which meshes with a gear 68 fixed to the cam shaft 31. One end of the cam shaft extends beyond the housing to receive a forward speed actuating lever 69. The cams on the cam shaft are so positioned that when the lever 69 is pulled to the limit of its backward movement, all of the movable clutch elements are held disengaged at which time the transmission is in neutral as indicated by the letter N in Figure 1 of the drawing. By pulling the lever backward a predetermined distance, such as shown in Figure 1 by the numeral 1, the friction clutch 42 will engage placing the transmission in first or low speed. By pulling the lever further, the clutch 42 will disengage and the clutch 41 engage, thus driving the driven shaft at second or intermediate speed. By pulling the lever 69 to the limit of its forward movement, the clutch 41 will disengage and the clutch 23 engage whereupon the driven shaft 20 is being driven direct from the drive shaft, or in high speed. Reverse speed is obtained in a manner already explained, by moving the reverse lever 61 to the position indicated by the letter R in Figure 1 and moving the lever 69 to second speed position.

For manually disengaging any clutch which may be in engaging position without going back through the different speeds, I mount a rocker shaft 70 and arms 72 in bearings 71 on the cover plate. Arms 72 are fixed to the rocker shaft and have pull bars 73 which respectively connect with the free ends of the levers for pulling any lever away from its engaging flat face. An actuating rod 74 is operatively connected to one of the arms 72 and is pivoted to a clutch pedal 75, whereby depression of the pedal will cause a pull upon the rod 74 which imparts a rearward rocking of the rocker shaft.

From the foregoing description, it will be understood that three forward speeds may be obtained by the successive operation of a hand lever, without requiring the actuation of a foot pedal when shifting from one speed to another, and consequently avoiding any clashing of gears and any possibility of stripping the gears. The actuation of the control lever is exceptionally simple to operate as it is only movable in a backward and forward direction and requires no lateral movement during the setting of the transmission to the desired speed.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a variable speed transmission, the combination of a drive shaft, a driven shaft, stub shafts driven by said drive shaft, counter-shafts journalled in alignment with said stub shafts, co-acting clutch elements between the drive shaft and driven shaft, and between the stub shafts and the respective counter shafts, a pair of varied size gears fixedly mounted on said driven shaft, varied size gears keyed on said counter-shafts for meshing engagement with the respective gears on said driven shaft, and manually operated means for successively operating the clutch elements between the stub shafts and counter shafts, and between the drive shaft and driven shaft, the gears on one of said counter-shafts being integral and slidably mounted, one of the integral gears constituting a reverse driving gear, a co-acting gear fixed to the other of said counter-shafts for meshing engagement with said reverse driving gear, and manually operated means for shifting said reverse driving gear into and out of meshing engagement with said co-acting gear and for moving its connected gear out of and into its companion gear.

2. In a variable speed transmission, the combination with a driven forward speed rotatable counter-shaft, a pair of integral gears slidably mounted thereon, a driven shaft, a pair of integral driven gears fixedly mounted thereon, a second counter-shaft, a pair of intermediate gears fixedly mounted thereon, one of the intermediate gears being in constant mesh with one of the gears of said driven shaft, and manually operated means for selectively sliding said first pair of gears into meshing engagement with the other intermediate gear and the other driven gear on said driven shaft respectively to rotate said driven shaft in either a clockwise or counterclockwise direction.

In testimony whereof I have affixed my signature.

ERNEST BACKHAUS.